US008635276B2

(12) United States Patent
Fujishita

(10) Patent No.: US 8,635,276 B2
(45) Date of Patent: Jan. 21, 2014

(54) SYSTEM AND NETWORK TERMINAL FOR IP COMMUNICATIONS

(75) Inventor: Masahiro Fujishita, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1303 days.

(21) Appl. No.: 12/163,326

(22) Filed: Jun. 27, 2008

(65) Prior Publication Data

US 2009/0006554 A1 Jan. 1, 2009

(30) Foreign Application Priority Data

Jun. 29, 2007 (JP) ................ P2007-173523

(51) Int. Cl.
G06F 15/16 (2006.01)
(52) U.S. Cl.
USPC ............................ 709/204; 709/206; 370/360
(58) Field of Classification Search
USPC .................................. 709/204, 206; 370/360
See application file for complete search history.

(56) References Cited

U.S. PATENT DOCUMENTS

| 5,517,551 A | 5/1996 | Arai |
| 7,194,513 B2 * | 3/2007 | Sharif et al. ................. 709/206 |
| 2003/0074496 A1 | 4/2003 | Takahashi et al. |
| 2006/0251060 A1 | 11/2006 | Iwakawa et al. |

FOREIGN PATENT DOCUMENTS

| JP | H05-095393 A | 4/1993 |
| JP | 2001-306339 A | 11/2001 |
| JP | 2002-111810 A | 4/2002 |
| JP | 2003-091423 A | 3/2003 |
| JP | 2005-175722 | 6/2005 |
| JP | 2006-210973 A | 8/2006 |
| JP | 2006-229298 A | 8/2006 |
| JP | 2006-270837 A | 10/2006 |
| JP | 2006-325172 | 11/2006 |
| JP | 2007-028112 | 2/2007 |
| JP | 2007-28448 | 2/2007 |
| JP | 2007-53711 | 3/2007 |

OTHER PUBLICATIONS

Japan Patent Office; Office Action in Japanese Patent Application No. 2007-173523 A (counterpart to the above-captioned U.S. patent application) mailed Sep. 8, 2009.

* cited by examiner

Primary Examiner — Adnan Mirza
(74) Attorney, Agent, or Firm — Baker Botts L.L.P.

(57) ABSTRACT

A network terminal is capable of running a plurality of user environments in parallel and is connected to an interface device. The network terminal includes a plurality of communication units, a plurality of collaborating units, and a monitoring unit. The plurality of communication units are provided in one to one correspondence with a plurality of user environments. Each communication unit is configured to implement an Internet Protocol telephone call in the corresponding user environment. The plurality of collaborating units are provided in one to one correspondence with the plurality of communication units. Each collaborating unit is configured to perform a collaborative control on the corresponding communication unit and the interface device to thereby establish communications between the interface device and the corresponding communication unit. The monitoring unit monitors whether any of the collaborating units is performing the collaborative control. One of the plurality of collaborating units performs the collaborative control when the subject collaborating unit receives: notification from the monitoring unit indicating that none of the plurality of collaborating units is performing a collaborative control; and notification from the interface device specifying the subject collaborating unit as a specified collaborating unit to perform the collaborating control.

18 Claims, 10 Drawing Sheets

SYSTEM AND NETWORK TERMINAL FOR IP COMMUNICATIONS

CROSS REFERENCE TO RELATED APPLICATION

This application claims priority from Japanese Patent Application No. 2007-173523 filed Jun. 29, 2007. The entire content of this priority application is incorporated herein by reference.

TECHNICAL FIELD

The present invention relates to a system and a network terminal capable of controlling communications between a telephone application and the interface device connected to the network terminal.

BACKGROUND

An Internet Protocol (IP) telephone system such as Skype is well known in the art. The IP telephone system can be used by installing a telephone application on a personal computer, telephone terminal, or the like. The telephone application is software developed by the IP telephone provider for originating and receiving calls and for implementing voice communications. The telephone application registers a user ID, display name, and profile of a user in order to provide details on the user using the IP telephone.

In recent years, computer operating systems have employed a multi-user environment capable of running a plurality of user environments in parallel. With this operating system, software such as a communication application can run continuously in each user environment independent of each other. One example of such an operating system is Microsoft's Windows XP (registered trademark). In Windows XP, while a user is logged onto Windows (registered trademark), another user may also log on without the first user logging off. Accordingly, software can continue to run in each user environment.

Japanese unexamined patent application publication No. 2005-175722 describes an IP phone system including a personal computer capable of communicating with a network, and a handset that can be connected to the computer with a USB cable. In this system, the person using the handset may make an IP telephone call to another user of a remote device on the network through a telephone application installed on the personal computer.

SUMMARY

Since the telephone application records a user ID and other data for identifying the user, the user must always use the telephone application in which the user's own ID and the like are registered when making a telephone call, for example. However, Japanese unexamined patent application publication No. 2005-175722 does not mention anything about a multi-user environment. If the technology described in this publication were applied to a multi-user environment, the telephone application would be operating in each user environment running in parallel on the personal computer.

While the telephone application is operating in each user environment, only one device driver is operating on the operating system for each type of device. The device driver controls operations of an input/output device and is used for connecting the handset to the personal computer. The device driver may be a human interface device (HID) driver for controlling an HID, or an audio driver for controlling an audio device, for example. Under these circumstances, if the handset transmits a command to the telephone application requesting a list of candidates from which a call destination can be selected, for example, the HID driver transmits this command to the telephone application, but the HID driver may not know to which telephone application the command is to be transferred. Consequently, the HID driver will transfer the command to all telephone applications or to a telephone application not intended by the user. If a list of call destination candidates (a contact list) is returned to the handset from each of the plurality of telephone applications, the user will not be able to know which list of contacts was returned from which telephone application. Further, the user will likely be at a loss when attempting to select one of the contacts from the list when a list of contacts the user was not expecting is returned from a telephone application other than the application in which the user's own ID is registered.

When the user selects a contact (call destination) from the contact list, the handset transmits a command to the telephone application requesting a telephone call be established with the contact. If the command is transmitted to the telephone application in which the user ID of the user are registered or to an intended telephone application, a call may be established with the contact using either the user ID of the user or an intended user ID. However, in this case the user does not know to which telephone application the command was transferred. In other words, it is possible that the telephone call is implemented using an unintended user ID. This problem is not limited to a request for a list of contacts, as there is sufficient potential for confusion in the transmission of commands between the telephone application and the handset.

When a call is performed with an external IP telephone terminal via the telephone application, the telephone application inputs voice data into an audio driver, and the audio driver reproduces the voice and transfers this voice to the handset. Through this operation, voice inputted through the external IP telephone terminal is reproduced on the handset. When a different IP telephone terminal issues a request for a telephone call to another telephone application, the other telephone application inputs sound data for a ringtone into the audio driver. Since the audio driver reproduces both the voice data for the call in progress and the sound data for the ringtone at this time, the ringtone sound is mixed with the voice and outputted from the handset. Further, if a call is started with the other telephone application in this state, multiple voices will be mixed and outputted through the handset already engaged in a telephone call.

Hence, this technology can lead to such problems as a user making an IP telephone call using a telephone application in which another user's ID is registered, and interference in communications between the handset and the plurality of telephone applications.

In view of the foregoing, it is an object of the invention to provide a network terminal, a method, and a system capable of controlling communications between a telephone application running on an operating system supporting multiple users of the network terminal and an interface device connected to the network terminal, while preventing interference in communications.

In order to attain the above and other objects, the invention provides a network terminal capable of running a plurality of user environments in parallel and being connected to an interface device. The network terminal includes a plurality of communication units, a plurality of collaborating units, and a monitoring unit. The plurality of communication units are provided in one to one correspondence with a plurality of user environments. Each communication unit is configured to implement an Internet Protocol telephone call in the corresponding user environment. The plurality of collaborating units are provided in one to one correspondence with the plurality of communication units. Each collaborating unit is configured to perform a collaborative control on the corresponding communication unit and the interface device to thereby establish communications between the interface device and the corresponding communication unit. The monitoring unit monitors whether any of the collaborating units is performing the collaborative control. One of the plurality of collaborating units performs the collaborative control when the subject collaborating unit receives: notification from the monitoring unit indicating that none of the plurality of collaborating units is performing a collaborative control; and notification from the interface device specifying the subject collaborating unit as a specified collaborating unit to perform the collaborating control.

According to another aspect, the present invention provides a network terminal connected to an interface device, the network terminal comprising a controller. The controller executes a multi-user operating system, a plurality of communication applications, a plurality of collaborating applications, and a monitoring application. The multi-user operating system is installed on the network device. The multi-user operation system is capable of running a plurality of different user environments in parallel. The plurality of communication applications are installed on the network device. The plurality of communication applications are provided in one to one correspondence with a plurality of user environments and being configured to be capable of running in parallel. Each communication application is configured to implement an Internet Protocol telephone call in the corresponding user environment. The plurality of collaborating applications are installed on the network terminal. The plurality of collaborating applications are provided in one to one correspondence with a plurality of communication applications and being configured to be capable of running in parallel. Each collaborating application are configured to perform a collaborative control on the corresponding communication application and the interface device to thereby establish communications between the interface device and the corresponding communication application, at least one of the plurality of collaborating applications running. The monitoring application monitors whether any of the collaborating applications is performing the collaborative control. One of the at least one running collaborating application performs the collaborative control upon receiving: notification from the monitoring application indicating that none of the at least one running collaborating application is performing the collaborative control; and notification from the interface device specifying the subject collaborating application as a specified collaborating application.

According to another aspect, the present invention provides a method executed by a network terminal capable of running a plurality of user environments in parallel and being connected to an interface device, the network terminal executing a plurality of communication applications installed on the network device, the plurality of communication application being provided in one to one correspondence with a plurality of user environments and being configured to be capable of running in parallel, each communication application being configured to implement an Internet Protocol telephone call in the corresponding user environment. The method includes: monitoring whether any of a plurality of collaborating applications is performing the collaborative control, the plurality of collaborating applications being provided in one to one correspondence with the plurality of user environments and being configured to be capable of running in parallel, each collaborating application being configured to perform a collaborative control on the corresponding communication application and the interface device to thereby establish communications between the interface device and the corresponding communication application; and performing the collaborative control by one of the at least one running collaborating application when the subject collaborating application receives: notification from the monitoring application indicating that none of the at least one running collaborating application is performing the collaborative control; and notification from the interface device specifying the subject collaborating application as a specified collaborating application.

According to another aspect, the present invention provides a computer-readable recording medium that stores a computer program for a network terminal capable of running a plurality of user environments in parallel and being connected to an interface device, the network terminal executing a plurality of communication applications installed on the network device, the plurality of communication application being provided in one to one correspondence with a plurality of user environments and being configured to be capable of running in parallel, each communication application being configured to implement an Internet Protocol telephone call in the corresponding user environment. The computer program instructions for: monitoring whether any of a plurality of collaborating applications is performing the collaborative control, the plurality of collaborating applications being provided in one to one correspondence with the plurality of user environments and being configured to be capable of running in parallel, each collaborating application being configured to perform a collaborative control on the corresponding communication application and the interface device to thereby establish communications between the interface device and the corresponding communication application; and performing the collaborative control by one of the at least one running collaborating application when the subject collaborating application receives: notification from the monitoring application indicating that none of the at least one running collaborating application is performing the collaborative control; and notification from the interface device specifying the subject collaborating application as a specified collaborating application.

According to another aspect, the present invention provides a system includes an interface device, a network terminal, and a monitoring unit. The network terminal is capable of running a plurality of user environments in parallel and being connected to the interface device. The network terminal includes a plurality of communication units, a plurality of collaborating units, and a monitoring unit. The plurality of communication units are provided in one to one correspondence with a plurality of user environments. Each communication unit being configured to implement an Internet Protocol telephone call in the corresponding user environment. The plurality of collaborating units are provided in one to one correspondence with the plurality of communication units. Each collaborating unit is configured to perform a collaborative control on the corresponding communication unit and the interface device to thereby establish communications between the interface device and the communication unit. The monitoring unit monitors whether any of the collaborating units is performing the collaborative control. The interface device specifies one of the running collaborating unit as specified collaborating unit. One of the plurality of collaborating units performs the collaborative control upon receiving: notification from the monitoring unit indicating that none of the plurality of collaborating units is performing a collaborative control; and notification from the interface device specifying the subject collaborating unit as a specified collaborating unit.

BRIEF DESCRIPTION OF THE DRAWINGS

The particular features and advantages of the invention as well as other objects will become apparent from the following description taken in connection with the accompanying drawings, in which.

DETAILED DESCRIPTION

Figure 1:
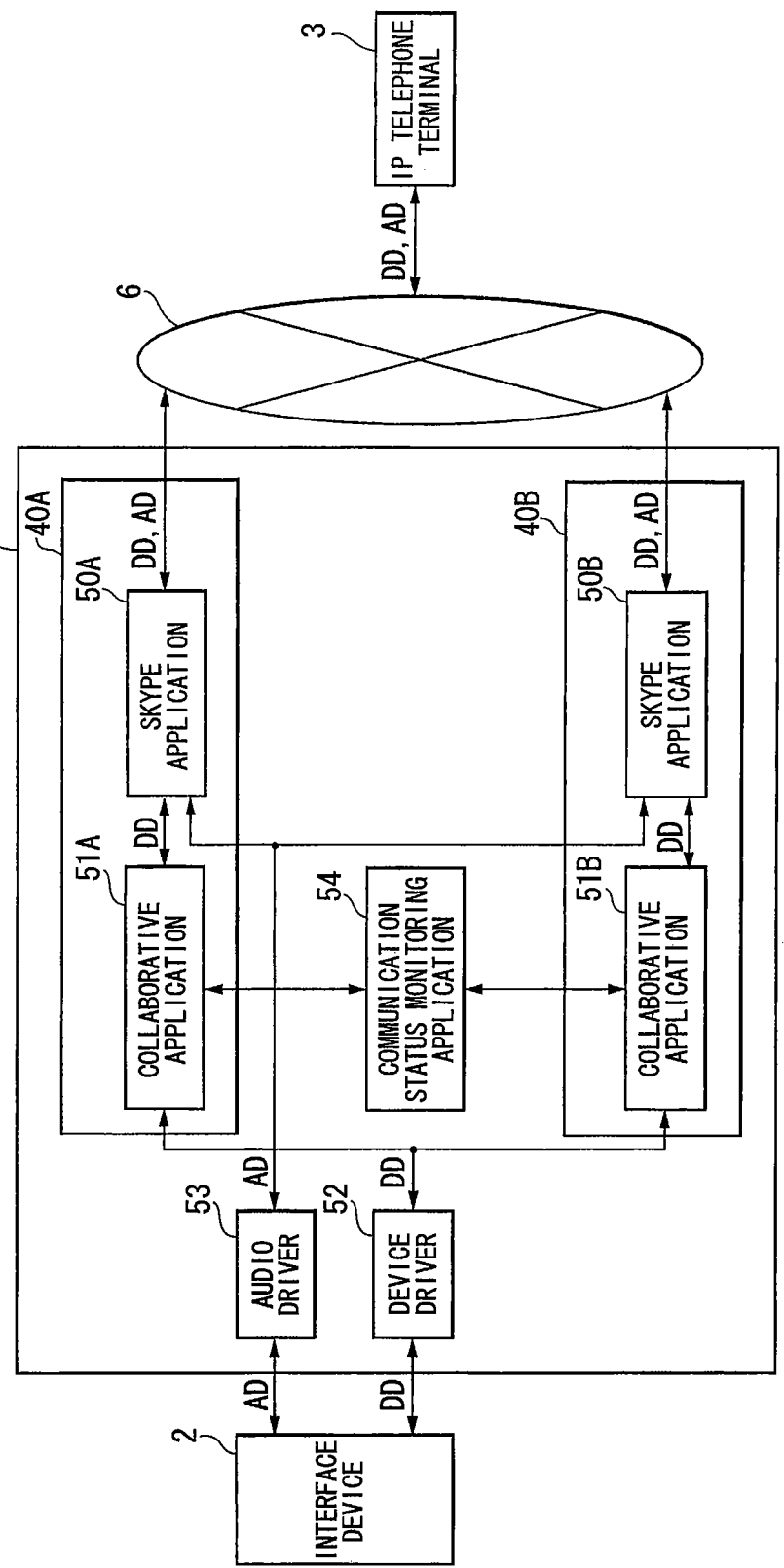
FIG. 1 is a block diagram showing the general structure of an IP telephone system according to a first embodiment of the present invention.

A network system and a network terminal according to the present invention will be described based on first and second embodiments while referring to the accompanying drawings wherein like parts and components are designated by the same reference numerals to avoid duplicating description.

Here, the first embodiment will be described with reference to FIGS. 1 through 7. FIG. 1 is a block diagram showing the general structure of an IP telephone system related to the present embodiment. The IP telephone system shown in FIG. 1 includes a network terminal 1, an interface device 2, and an IP telephone terminal 3. The network terminal 1 is configured of a personal computer, and the interface device 2 of a telephone device capable of performing an IP telephone call. The network terminal 1 and IP telephone terminal 3 are connected to each other and capable of communicating bi-directionally via a network 6, and the network terminal 1 and interface device 2 are connected via USB ports.

While only one IP telephone terminal 3 is shown connected to the network 6, it should be apparent that a plurality of IP telephone terminals can be connected and that the IP telephone system related to the present embodiment can implement IP telephone calls with each of the plurality of IP telephone terminals. Further, the IP telephone terminal is not limited to a terminal device such as a personal computer, but may also be a landline phone, and cell phone. In such a case, a converter, such as the SkypeIn device, is connected between the landline phone or cell phone and the network terminal to ensure compatibility of communication data.

An operating system installed on the network terminal 1 has a multi-user environment in which a plurality of user environments can be run in parallel. Since the various functions provided by the operating system are well known in the art, a detailed description of such functions will not be given here.

Next, a state of communications with application software operating on the network terminal 1 will be described with reference to FIG. 1. The following description will assume the case in which a user A and a user B are logged onto the network terminal 1. At this time, user environments 40A and 40B are running in parallel for each of the logged on users A and B. A Skype application 50A and a collaborative application 51A are running in the user environment 40A, while similarly a Skype application 50B and a collaborative application 51B are running in the user environment 40B. Hence, the Skype applications and the collaborative applications are running in both user environments.

The Skype applications 50A and 50B are telephone application programs facilitating the communication of data DD and audio data AD with the IP telephone terminal 3 via the network 6. Therefore, two Skype applications 50A and 50B are running simultaneously in parallel on the operating system.

The collaborative applications 51A and 51B are software for implementing collaboration between the respective Skype applications 50A and 50B and a device driver 52 through intercommunication of data DD. Hence, the two collaborative applications 51A and 51B are running simultaneously in parallel on the operating system. The data DD includes commands for implementing control between the network terminal 1 and interface device 2, mail and other communication data. Types of commands in the data DD include a command issued by the interface device 2 to the Skype applications 50A and 50B requesting data for a list of contacts, and a command to transmit data for the list of contacts from the Skype applications 50A and 50B to the interface device 2.

The device driver 52 is software for establishing collaboration between the collaborative applications 51A and 51B and the interface device 2 by exchanging data DD therebetween. Only a single device driver 52 operates on the operating system.

The network terminal 1 is also provided with an audio driver 53. The audio driver 53 is software that establishes collaboration between the Skype applications 50A and 50B and the interface device 2 and exchanges audio data AD therebetween. When the Skype applications 50A and 50B input audio data AD into the audio driver 53, the audio driver 53 reproduces the audio and transfers this audio to the interface device 2. Accordingly, audio data AD transmitted from the IP telephone terminal 3 is reproduced on the interface device 2. Only a single audio driver 53 runs on the operating system.

The network terminal 1 is also provided with a communication status monitoring application 54 that can be accessed by both the collaborative applications 51A and 51B. The communication status monitoring application 54 monitors the operating state of the collaborative applications 51A and 51B and determines whether one of the Skype applications 50A and 50B is engaged in communications. Only one communication status monitoring application 54 runs on the operating system.

Figure 2:
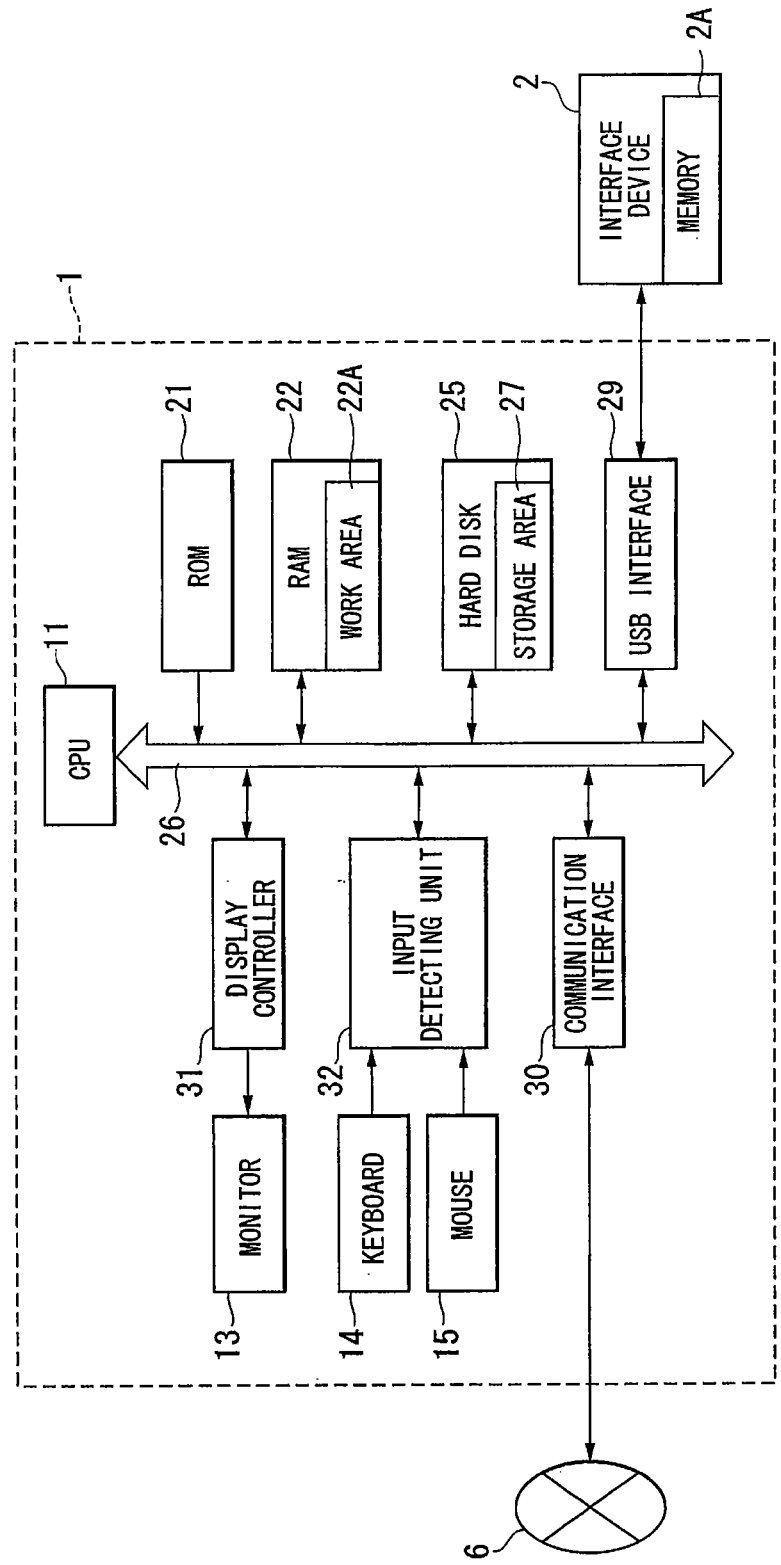
FIG. 2 is a block diagram showing an electrical structure of a network terminal.

Next, the electrical structure of the network terminal 1 will be described with reference to FIG. 2. The network terminal 1 is provided with a CPU 11 for controlling operations of the network terminal 1. The CPU 11 is connected via a bus 26 to a ROM 21 storing BIOS and other programs executed by the CPU 11, a RAM 22 temporarily storing results of calculations performed by the CPU 11, and a hard disk 25 for storing data. The RAM 22 is provided with various storage areas, including a work area 22A. The hard disk 25 has a storage area 27 for storing the Skype applications 50A and 50B, the collaborative applications 51A and 51B, the communication status monitoring application 54, and the like executed on the network terminal 1.

Also connected to the bus 26 are a USB interface 29 by which the network terminal 1 can be connected to the interface device 2 with a USB cable, a communication interface 30 for implementing communications with the network 6, a display controller 31 for displaying operation screens for the user on a monitor 13, and an input detecting unit 32 for detecting user input via a keyboard 14 or a mouse 15. The keyboard 14 and mouse 15 may be connected wirelessly through infrared communications or the like or may be connected by a short LAN cable, for example.

Figure 3:
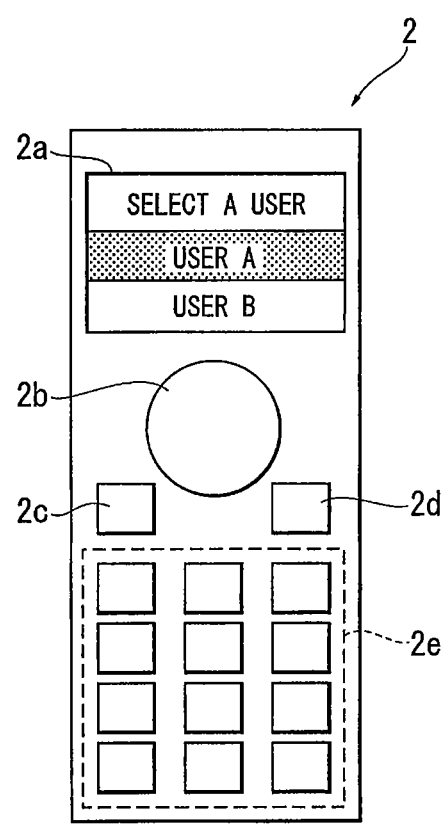
FIG. 3 is an explanatory diagram of an interface device.

FIG. 3 shows a structure of the interface device 2. The interface device 2 includes a monitor 2a, a cursor moving button 2b, a start call button 2c, an end call button 2d, and data input buttons 2e. The interface device 2 also has built-in memory 2A (FIG. 2). While the interface device 2 in this example is configured as a telephone handset, the interface device 2 is not limited to any particular configuration, provided that communications can be established with the IP telephone terminal 3. Therefore, it should be apparent that the interface device 2 may be configured of a multifunction device or the like provided with a facsimile function and mail function.

Next, the processes of various applications executed on the network terminal 1 according to the first embodiment will be described with reference to the flowcharts in FIGS. 4 through 7. The system of the first embodiment is configured to exclude communications with a user not specified by the interface device 2. The processes shown in FIGS. 4-7 below are executed by the CPU 11 of the network terminal 1.

In the following description, it will be assumed that users A and B are logged onto the network terminal 1 and that any logged on users A and B have not yet started the collaborative applications 51A and 51B. First, the CPU 11 executes the Skype applications stored in the storage area 27. Consequently, the Skype applications 50A and 50B are running in the user environments 40A and 40B, as shown in FIG. 1.

Next, steps in a collaborative application launching process for registering the logged on user A or B in the interface device 2 will be described with reference to the flowchart in FIG. 4. The collaborative application launching process begins when the user launches the collaborative application 51A, for example. In step (hereinafter "step" will be abbreviated as "S") 2, the launched collaborative application 51A uses the application programming interface (API) of Windows (registered trademark) to acquire the Windows user name "user A", for the user environment 40A in which the collaborative application 51A itself is running, as data identifying the user of the environment 40A, thereby knowing the operating environment in which the collaborative application 51A is running. The collaborative application 51A also transmits the acquired user name "user A" to the interface device 2 via the USB interface 29. In S3 the interface device 2 records the user name "user A" in the memory 2A, thus completing the process for registering user A on the interface device 2.

If user B subsequently launches the collaborative application 51B, the process in S2 and S3 is repeated to register the user name "user B" in the memory 2A. Therefore, both user A and user B are registered on the interface device 2 at this time.

Next, a collaborative application ending process for canceling the registration of a user on the interface device 2 will be described with reference to the flowchart in FIG. 5. In the following example, it will be assumed that both user A and user B are registered on the interface device 2. The collaborative application ending process in FIG. 5 begins when user A ends the collaborative application 51A, for example. In S12, the collaborative application 51A uses the API of Windows to acquire the Windows user name "user A" for the user environment 40A in which the collaborative application 51A itself is running. The collaborative application 51A also transmits this acquired user name "user A" to the interface device 2 via the USB interface 29. In S13 the interface device 2 deletes the user name "user A" from the memory 2A, thereby completing the process to remove the registration of user A from the interface device 2.

If user B subsequently ends the collaborative application 51B, the process in S12 and S13 is repeated to remove registration of the user name "user B" from the memory 2A. At this time, no users are registered on the memory 2A.

Figure 4:
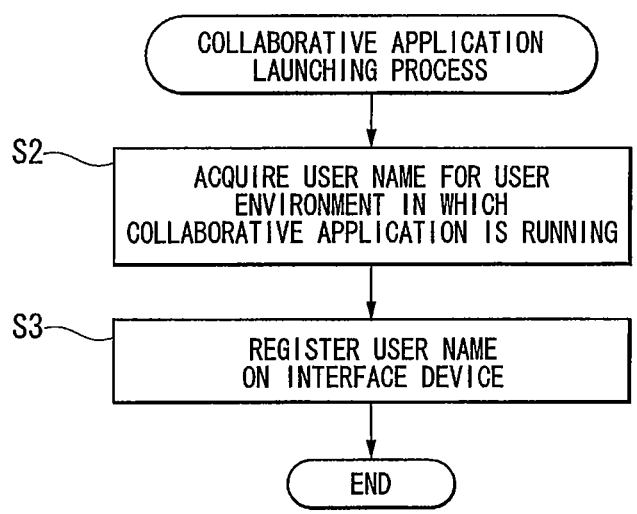
FIG. 4 is a flowchart illustrating steps in a collaborative application launching process according to the first embodiment.
Figure 5:
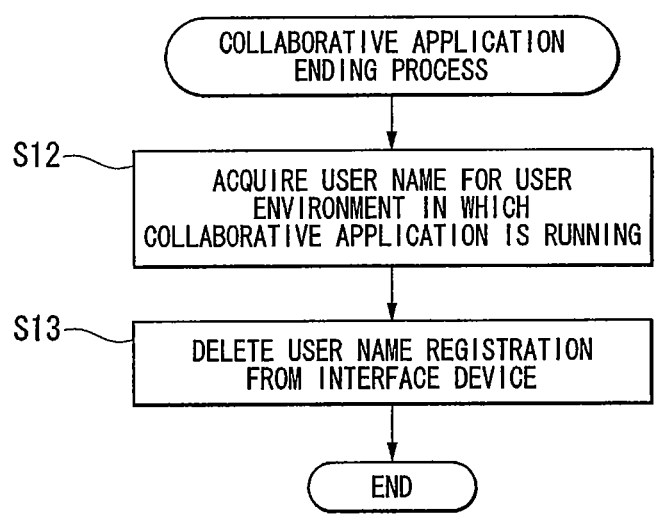
FIG. 5 is a flowchart illustrating steps in a collaborative application ending process according to the first embodiment.

Through the processes of FIGS. 4 and 5, the user running the collaborative application is registered on the interface device 2. By updating the user's registration status when the collaborative application is started and ended, it is possible to learn in real-time which users are running collaborative applications.

The data identifying the user may be any data, provided that the user can be identified unambiguously. Hence, it is possible to use the user name of the Skype application, an e-mail address, or the like rather than the Windows user name for the user environment. Further, while user names are registered on the interface device 2 in the above example, user names may instead be registered on the network terminal 1, whereby the interface device 2 would query the network terminal 1 for the registered user name.

Next, a call process implemented when a user calls the IP telephone terminal 3 from the interface device 2 will be described with reference to the flowchart in FIG. 6. The following description will assume that user A initiates the phone call while the collaborative applications 51A and 51B are running in parallel.

Figure 6:
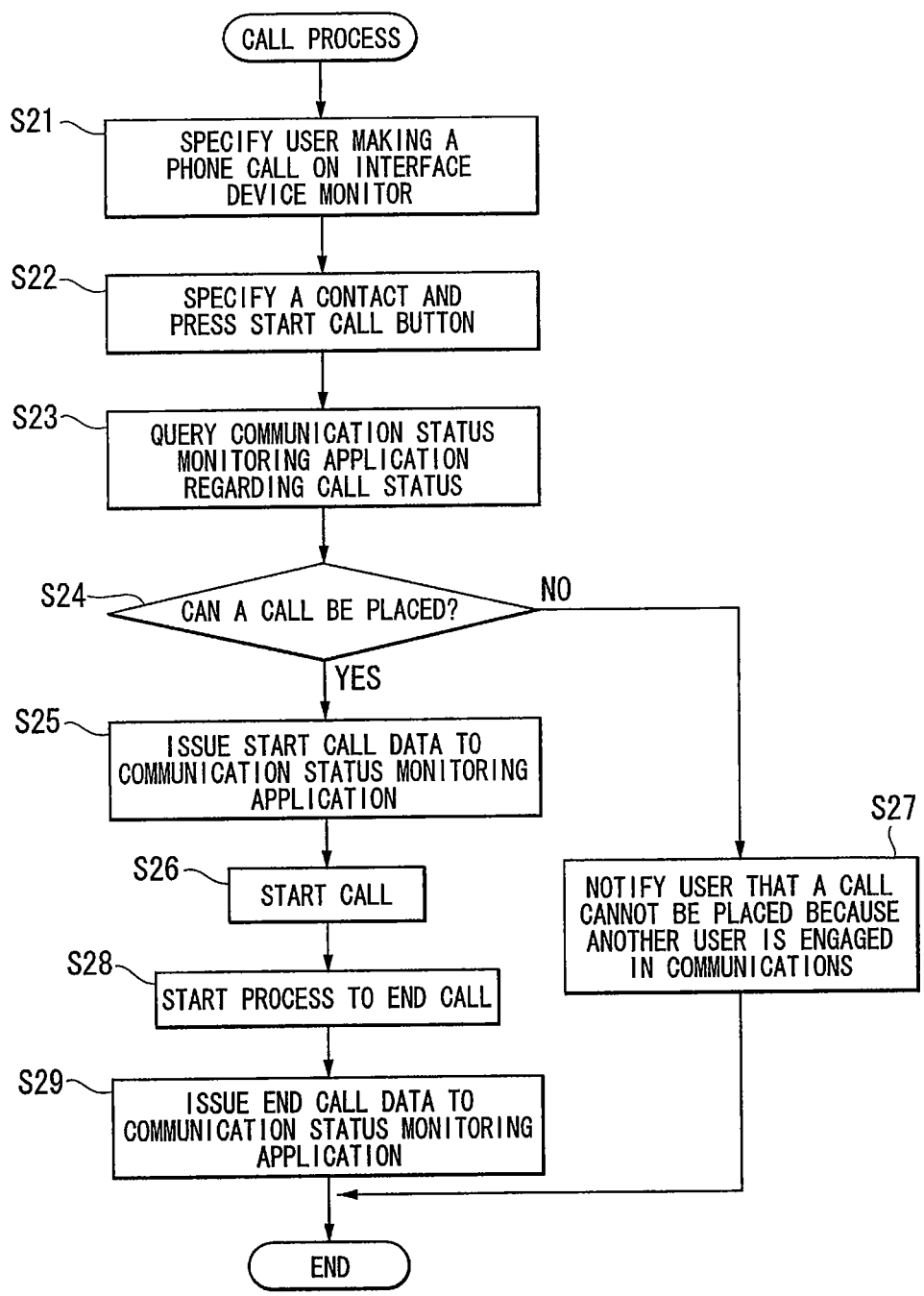
FIG. 6 is a flowchart illustrating steps in a call process according to the first embodiment.

The process in FIG. 6 begins when the user presses on the start call button 2c (FIG. 3), for example, but may also be performed when the user presses a different button or may be performed periodically. In S21 of this process, a selection screen for the user initiating the phone call is displayed on the monitor 2a (FIG. 3). Since the collaborative applications 51A and 51B are running in parallel, both users A and B are displayed on the monitor 2a. User A uses the cursor moving button 2b to select "user A" as the specified user initiating the phone call. The interface device 2 notifies the collaborative application 51A via the USB interface 29 that the collaborative application 51A has been selected as the specified collaborative application for the specified user A. In this way, the collaborative application 51A can be unambiguously set as the specified collaborative application for collaborating with the device driver 52. Further, the Skype application 50A can be unambiguously set as the Skype application collaborating with the audio driver 53.

In S22 the interface device 2 inputs a command to the Skype application 50A via the device driver 52 and the collaborative application 51A requesting that data for a list of contacts be transmitted to the interface device 2. When the Skype application 50A returns the list of contacts to the interface device 2, the interface device 2 displays the list in the selection screen on the monitor 2a. At this time, user A manipulates the cursor moving button 2b to select a desired contact from the list and presses the start call button 2c in order to begin the phone call.

In S23 the collaborative application 51A queries the communication status monitoring application 54 for the call status of all Skype applications in the network terminal 1.

In S24 the collaborative application 51A determines whether the Skype application 50A is available for a call. The collaborative application 51A makes this determination by checking whether the communication status monitoring application 54 has written a busy flag to the work area 22A on the network terminal 1.

If the communication status monitoring application 54 notifies the collaborative application 51A that a busy flag has not been written to the work area 22A, then the collaborative application 51A determines that a phone call is possible (S24: YES), and advances to S25. Upon receiving this notification, the collaborative application 51A enters an active state for mediating the exchange of data DD between the Skype application 50A and the device driver 52. Here, the active state indicates a state in which the collaborative application 51A can handle (acquire the handle of) the device driver 52, acquire data DD from the device driver 52, input data DD into the Skype application 50A, acquire data DD from the Skype application 50A, and input data DD into the device driver 52.

In S25 the collaborative application 51A issues start call data to the communication status monitoring application 54. The communication status monitoring application 54 writes a busy flag in the work area 22A in response to the received start call data.

In S26 the CPU 11 starts the phone call. Since the collaborative application 51A is in the active state at this time, the collaborative application 51A collaborates with the device driver 52 and Skype application 50A to communicate the data DD. On the other hand, since the collaborative application 51B is not in the active state, the collaborative application 51B performs no collaboration between the interface device 2 and Skype application 50B. Accordingly, the device driver 52 and collaborative application 51A can be unambiguously associated with each other. Consequently, this configuration enables communication using only the Skype application 50A that user A has specified on the interface device 2, while disallowing communications with the other Skype application 50B, even though both of the Skype applications 50A and 50B are running simultaneously. Therefore, interference between the Skype applications 50A and 50B can be prevented.

Next, a process for ending a telephone call begins in S28 when user A presses the end call button 2d (FIG. 3), causing the interface device 2 to input an instruction into the collaborative application 51A for ending the telephone call. In S29 the collaborative application 51A issues end call data to the communication status monitoring application 54. The communication status monitoring application 54 deletes the busy flag from the work area 22A in response to the received end call data, and the call process subsequently ends.

On the other hand, when the communication status monitoring application 54 notifies the collaborative application 51A that a busy flag has been written to the work area 22A, the collaborative application 51A determines that a phone call is not possible (S24: NO), and advances to S27. In S27 the collaborative application 51A transmits data to the interface device 2 via the USB interface 29 indicating that the call could not be placed because another user (user B) is engaged in communications. The interface device 2 notifies user A by displaying a message on the monitor 2a (FIG. 3) indicating that a call cannot be placed at this time, and the call process ends.

Next, a call reception process of the collaborative applications 51A and 51B during a reception operation performed in response to an access request from the IP telephone terminal 3 will be described with reference to the flowchart in FIG. 7. In the following example, it will be assumed that the IP telephone terminal 3 has issued an access request to the user B. Since display names for a plurality of contacts and including the display name of the collaborative application 51B are displayed on the IP telephone terminal 3, the user of the IP telephone terminal 3 can issue an access request to user B by selecting the display name from the collaborative application 51B from the contact list.

Figure 7:
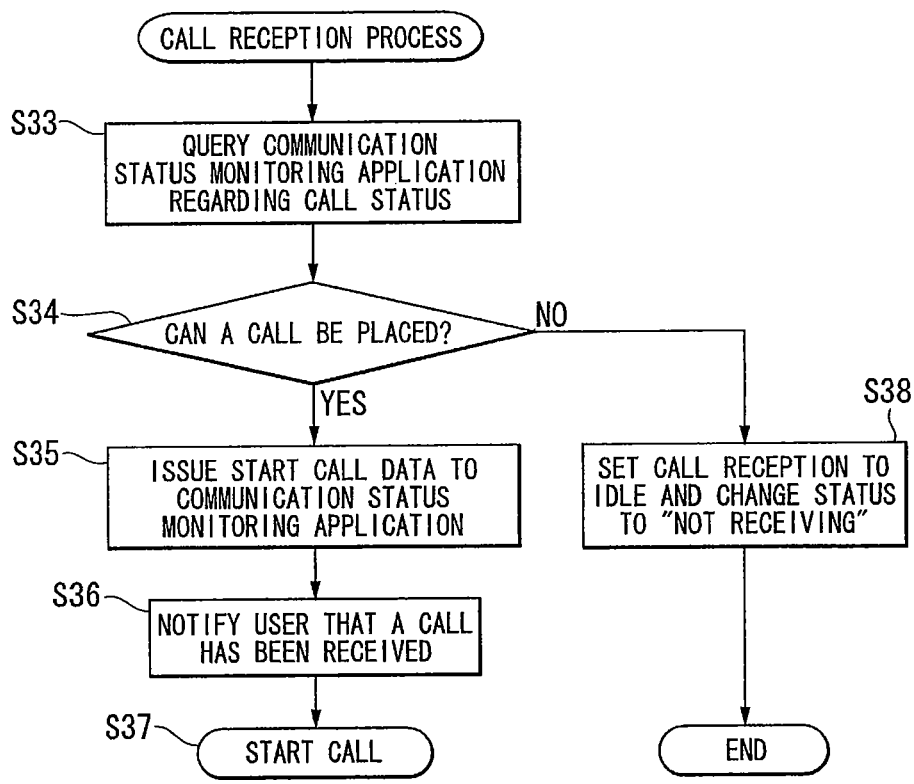
FIG. 7 is a flowchart illustrating steps in a call reception process according to the first embodiment.

Prior to the beginning of the call reception process in FIG. 7, it will be assumed that both the collaborative applications 51A and 51B are in a standby state waiting for a reception notification from the Skype applications 50A and 50B, respectively. A reception notification in this example is a notification that an access command has been received from the IP telephone terminal 3. The call reception process begins from S33 when a reception notification is received. In the following example, the CPU 11 determines that the collaborative application 51B has received a reception notification.

In S33 the collaborative application 51B queries the communication status monitoring application 54 for the call status.

In S34 the CPU 11 determines whether the Skype application 50B is in the available state. If the communication status monitoring application 54 notifies the collaborative application 51B that a busy flag has not been written to the work area 22A, the collaborative application 51B determines that a telephone call can be placed (S34: YES), and advances to S35. At this time, the collaborative application 51B enters, as a specified collaborative application, an active state capable of communicating between the Skype application 50B and the interface device 2.

In S35 the collaborative application 51B transmits start call data to the communication status monitoring application 54, and the communication status monitoring application 54 writes a busy flag to the work area 22A of the network terminal 1 in response to this start call data.

In S36 the collaborative application 51B transmits data to the interface device 2 via the USB interface 29 indicating that a telephone call has been received from the IP telephone terminal 3. At this time, the interface device 2 notifies user B by displaying a message on the monitor 2a indicating that a telephone call has been received.

The telephone call begins when user B presses the start call button 2c. Since the collaborative application 51B is in the active state at this time, the collaborative application 51B can control the communication of data DD between the interface device 2 and the Skype application 50B. Hence, a unique correspondence can be established between the device driver 52 and the collaborative application 51B. Since data DD from the interface device 2 is not inputted into the Skype application 50A at this time, a telephone call is not initiated with the Skype application 50A while the Skype application 50B is engaged in a call, thereby preventing the audio driver 53 from inputting a combination of voices from two telephone calls into the interface device 2. Further, since the Skype application 50A does not input data DD into the interface device 2, even if an external terminal other than the IP telephone terminal 3 issues an access request to the Skype application 50A, the Skype application 50A will not initiate a telephone call at this time.

On the other hand, if the communication status monitoring application 54 issues a notification to the collaborative application 51B indicating that a busy flag has been written to the work area 22A, the collaborative application 51B determines that a telephone call cannot be placed (S34: NO), and advances to S38. In S38 the collaborative application 51B becomes idle without transmitting data to the interface device 2 indicating that a telephone call has been received from the IP telephone terminal 3. The collaborative application 51B also notifies the Skype application 50B that a telephone call cannot be implemented since another user (user A) is engaged in a call. The Skype application 50B notifies the IP telephone terminal 3 that a telephone call is not possible by modifying its status to "not receiving," and the process subsequently ends. Here, the status of the Skype application 50B is data notifying external devices on the network 6 of its current state. The Skype application 50B may also update the interface device 2 in S38 by transmitting data indicating that a call was received but cannot be implemented at this time. The Skype application 50B may also identify the caller at this time.

As described above, in the network terminal 1 and network system according to the first embodiment, the communication status monitoring application 54 monitors currently running collaborative applications 51A and 51B to determine which if any is performing collaborative control. A collaborative application performs collaborative control after receiving notification from the communication status monitoring application 54 that none of the other collaborative applications currently running is performing collaborative control and upon receiving notification from the interface device 2 specifying the collaborative application itself. Accordingly, the network terminal 1 can unambiguously set one collaborative application for providing collaborative control between the corresponding Skype application and the interface device 2. Therefore, the user can select a desired user environment from the interface device 2 in a multi-user environment and can place a telephone call through the telephone application operating in this environment. The network terminal 1 also prevents interference of communications between the interface device 2 and the plurality of Skype applications 50A and 50B.

With the network terminal 1 according to the first embodiment, the collaborative application notifies the interface device 2 that collaborative control cannot be performed upon receiving notification from the communication status monitoring application 54 that one of the currently running collaborative applications is performing collaborative control and upon receiving notification from the interface device 2 specifying the collaborative application itself as the specified collaborative application. Since another Skype application is engaged in communications at this time, the network terminal 1 can notify the user via the interface device 2 that communications cannot be established using the specified Skype application.

With the network terminal 1 according to the first embodiment, the collaborative application transmits user identification data (user name in this embodiment) to the interface device 2 when the collaborative application is launched. The user identification data identifies the user corresponding to a Skype application associated with the collaborative application. Accordingly, the interface device 2 can learn whether any Skype application is running when the collaborative application is started, and the user can be notified of information on the Skype application that is being used via the interface device 2.

With the network terminal 1 according to the first embodiment, the communication status monitoring application 54 stores data in the work area 22A of the network terminal 1 indicating that collaborative control is being performed when the specified collaborative application begins such collaborative control. The communication status monitoring application 54 stores data in the work area 22A indicating that collaboration control has ended when the specified collaborative application ends collaborative control. Accordingly, data indicating whether one of the collaborative applications is performing collaborative control can be shared among the collaborative application 51A and collaborative application 51B running in the user environments. The above data is updated each time a collaborative application is started or ended.

With the network terminal 1 and network system according to the first embodiment, the collaborative application sets itself as the specified collaborative application when monitoring results acquired from the communication status monitoring application 54 indicate that none of the collaborative applications is performing collaborative control and when another IP telephone terminal 3 requests via the network 6 to the Skype application corresponding to the collaborative application. Accordingly, regardless of whether the collaborative applications 51A and 51B running on the operating system are the specified collaborative application, the collaborative applications 51A and 51B can receive an access request from another external IP telephone terminal 3 on the network 6. Therefore, each of the running Skype applications 50A and 50B can respond to an access request from the IP telephone terminal 3. The Skype applications 50A and 50B operated by users A and B can each await an access request. This configuration prevents communication interference between a Skype application collaborating with the interface device 2 in response to an access request, and a Skype application operating in another user environment and enables the Skype applications to respond without error to access requests from the IP telephone terminal 3.

With the network terminal 1 and network system according to the first embodiment, the collaborative applications 51A and 51B transfer data via the Skype applications 50A and 50B to the IP telephone terminal 3, which is the source of an access request, indicating that collaborative control cannot be controlled, when the acquired monitoring results indicate that another collaborative application is currently performing collaborative control. Accordingly, since another Skype application is currently engaged in communications, the collaborative applications 51A and 51B can notify the source of the access request that communication cannot be established using the Skype application indicated in the access request.

Figure 8:
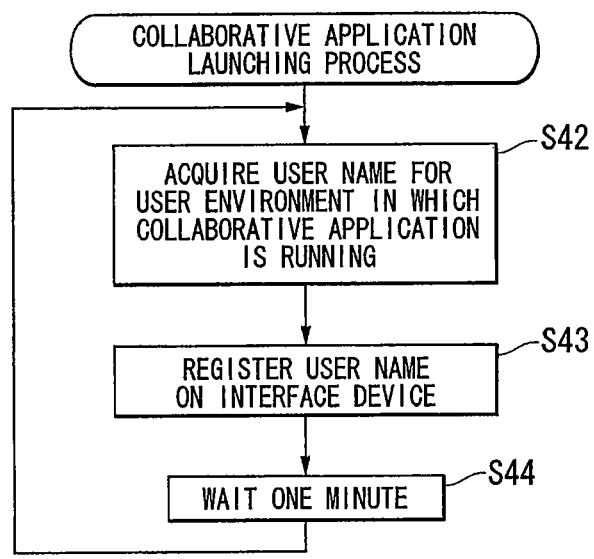
FIG. 8 is a flowchart illustrating steps in collaborative application launching process according to a second embodiment.

Next, a network system according to a second embodiment will be described with reference to FIGS. 8 and 9. The network system according to the second embodiment periodically monitors users that can make telephone calls. Since the structure of the network terminal 1 in the second embodiment is identical to that in the first embodiment, a description of this structure will not be repeated.

Here, the collaborative application launching process of periodically monitoring users that have launched collaborative applications will be described with reference to the flowchart in FIG. 8. FIG. 8 is a flowchart illustrating steps in the collaborative application launching process according to second embodiment performed on the network terminal 1. The following description will assume that user A launches the collaborative application 51A when neither the collaborative application 51A nor collaborative application 51B is running. In S42 at the beginning of this process, the collaborative application 51A acquires the Windows user name "user A" for the user environment 40A in which the collaborative application 51A is running as the user identification data. The collaborative application 51A transmits the acquired user name "user A" to the interface device 2 via the USB interface 29. In S43 the interface device 2 records the user name for user A in the memory 2A.

In S44 the collaborative application 51A performs an operation to wait for a prescribed interval (one minute, for example) before returning to S42 and repeating the process described above. Naturally, the interval of waiting can be set arbitrarily and is not limited to one minute.

Next, a collaborative application ending process for periodically monitoring users who have ended the collaborative application will be described with reference to the flowchart in FIG. 9. FIG. 9 is a flowchart illustrating steps in the collaborative application ending process performed on the interface device 2. The following example assumes that both the collaborative applications 51A and 51B are running in parallel and that the interface device 2 has been shut down. When the interface device 2 is started, the interface device 2 first receives the user names for the currently running collaborative applications ("user A" and "user B") from the collaborative applications 51A and 51B and records this data in the memory 2A as user identification data.

Figure 9:
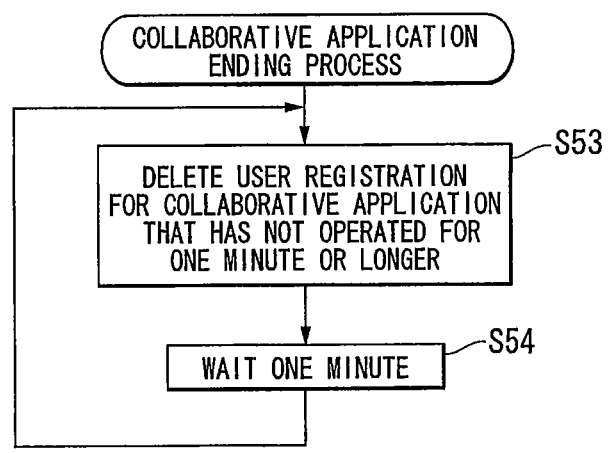
FIG. 9 is a flowchart illustrating steps in a collaborative application ending process according to the second embodiment.

In S53 of FIG. 9, the interface device 2 determines whether there exists a collaborative application that has not operated for a prescribed interval (one minute, for example) or longer. Since the interface device 2 receives in S43 user names from the running collaborative applications 51A and 51B every minute in the second embodiment, the interface device 2 determines that a collaborative application for a certain user has not been running for at least the prescribed interval when a user that existed in the previous reception no longer exists in the current reception. In such a case, the interface device 2 deletes the user name for the collaborative application that has not be running for a minute or more from the memory 2A, canceling the registration.

The method of determining whether a collaborative application is not running for a prescribed interval or more is not limited to the method described above. For example, the interface device 2 may also receive in S43 the time at which a user name was acquired from the running collaborative applications 51A and 51B in addition to the user name of the user operating the collaborative application. By comparing the acquired time to the current time, the interface device 2 can determines whether the collaborative application has not been running for the prescribed interval or greater.

In S54 the interface device 2 performs an operation to wait for a prescribed interval (one minute) before returning to S53 and repeating the process described above.

As described above, with the network terminal 1 and network system according to the second embodiment, the collaborative applications 51A and 51B transmit user identification data possessed by the Skype applications 50A and 50B corresponding to the collaborative applications 51A and 51B to the interface device 2 at prescribed intervals while the collaborative applications 51A and 51B are running. In this way, the interface device 2 can periodically update data indicating whether the collaborative applications 51A and 51B are running. Since user identification data for collaborative applications currently running is updated periodically, it is possible to learn reliably which of the collaborative applications is running, even when a collaborative application quits unexpectedly due to a program error, for example.

Figure 10:
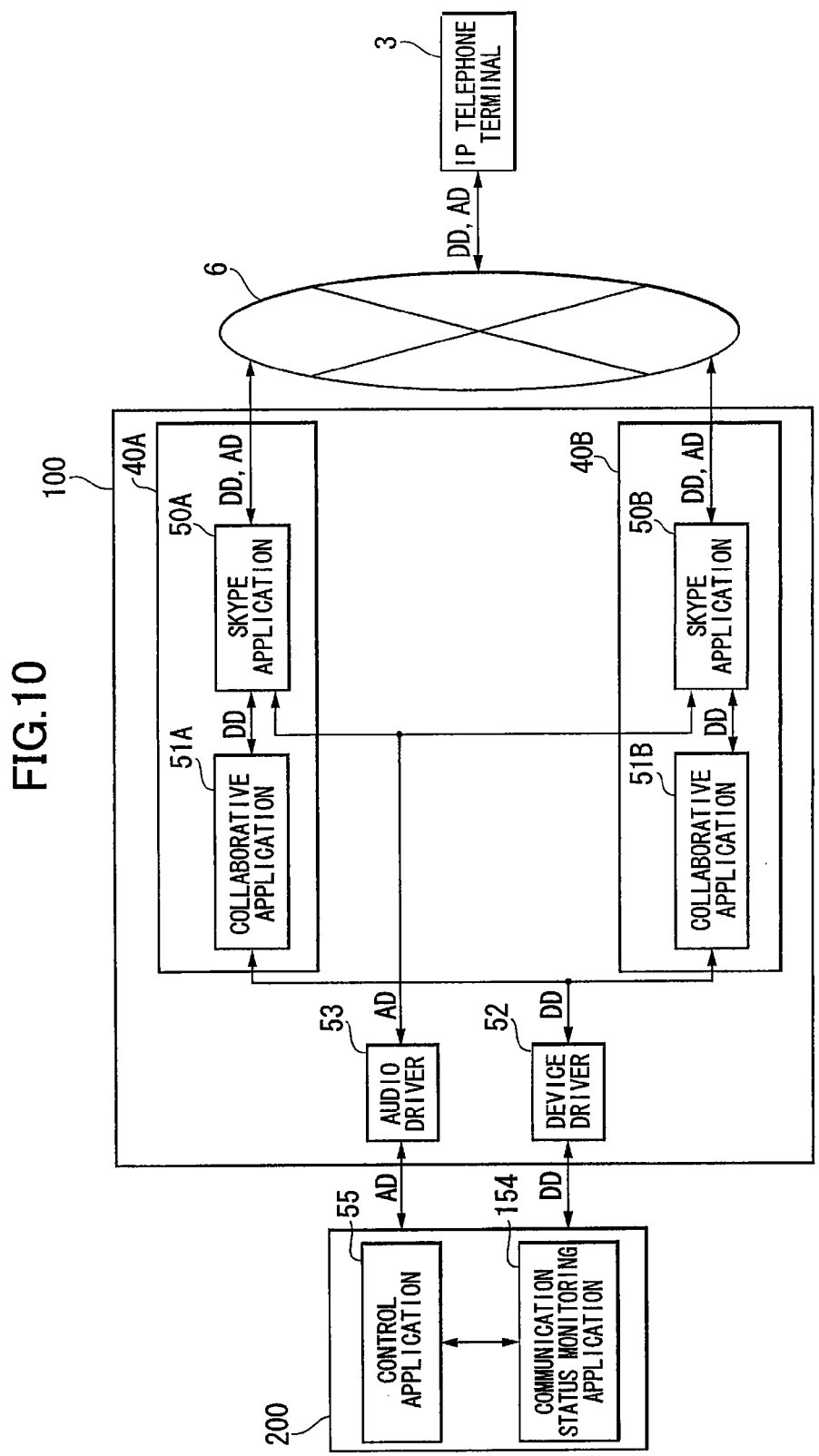
FIG. 10 is a block diagram showing a variation of the IP telephone system.

While the invention has been described in detail with reference to the embodiments thereof, it would be apparent to those skilled in the art that various changes and modifications may be made therein without departing from the spirit of the invention. For example, while the communication status monitoring application 54 operates on the network terminal 1 in the first and second embodiments described above, the present invention is not limited to this configuration. The communication status monitoring application may be executed on an interface device 200, as shown in FIG. 10. In FIG. 10, a communication status monitoring application 154 and a control application 55 operate on the interface device 200. The interface device 200 has the same configuration as the interface device 2 according to the first embodiment except that the interface device 200 has the communication status monitoring application 154 and the control application 55. The collaborative applications 51A and 51B exchange data DD with the communication status monitoring application 154 via the device driver 52. A network terminal 100 has the same configuration as the network terminal 1 according to the first embodiment except that the network terminal 100 has no communication status monitoring application 54.

The operations of this system will be described next. In this description, it will be assumed that the user initiates a phone call while the collaborative applications 51A and 51B are running in parallel. The process according to this modification is the substantially same as the flowchart of FIG. 6 according to the first embodiment. More specifically, in S21, using the cursor moving button 2b (FIG. 3) of the interface device 200, user A selects "user A" as the specified user for initiating a phone call. The control application 55 sets the collaborative application 51A to an active state via the device driver 52. Next, the control application 55 receives data of a contact list from the Skype application 50A via the collaborative application 51A and displays this contact list on the monitor 2a of the interface device 200. In S22, user A uses the cursor moving button 2b to select a desired contact from the contact list and presses the start call button 2c to start the telephone call.

When beginning the phone call, the control application 55 queries the communication status monitoring application 154 for the call status (S23). In S24, the communication status monitoring application 154 reports the status to the control application 55 based on whether a busy flag has been written to the memory 2A of the interface device 200. If a busy flag has not been written to the memory 2A, indicating that a telephone call can be placed (S24: YES), the control application 55 transfers start call data to the communication status monitoring application 154 (S25). The collaborative application 51A, now in an active state, begins implementing collaborative control to enable the exchange of data DD between the interface device 200 and the Skype application 50A (S26), and the collaborative application 51A performs the processes of S28 and S29. However, if the busy flag has been written to the memory 2A, indicating that a telephone call can be placed (S24: NO), the control application 55 notifies the user A that a call cannot be placed because another user is engaged in communications (S27).

Consequently, this configuration enables communication using only the Skype application 50A that user A has specified on the interface device 200, while disallowing communications with the Skype application 50B, even though both of the Skype applications 50A and 50B are running simultaneously. Therefore, interference between the Skype applications 50A and 50B is also prevented in the configuration shown in FIG. 10.

While users are registered in the memory 2A of the interface device 2 or 200 in the embodiments and modification described above, the present invention is not limited to this configuration and users may be registered in the work area 22A of the network terminal 1 or 100 instead. In this case, the network terminal 1 or 100 transmits the list of registered users to the interface device 2 or 200 via the device driver 52. With this configuration, a list of users can be shared among a plurality of interface devices 2 or 200 connected to the network terminal 1 or 100.

Further, in the first embodiment, the collaborative application 51A makes the determination by checking whether the communication status monitoring application 54 has written a busy flag to the work area 22A on the network terminal 1. However, The collaborative application 51A makes the determination by checking whether the communication status monitoring application 54 has written a busy flag to a storage device accessible from any application program running in the user environments 40A and 40B, such as a registry on the hard disk 25.

In the embodiments and modification described above, the collaborative applications SA and 51B transfer start call data and end call data to the communication status monitoring application 54, but it should be apparent that the communication status monitoring application 54 may be configured to query the collaborative applications 51A and 51B at prescribed intervals regarding whether collaborative control is being performed. Since data regarding collaborative applications performing control is updated periodically in this configuration, the communication status monitoring application 54 can reliably learn which of the collaborative application is performing control, even when a collaborative application quits unexpectedly due to a program error, for example.

While the two user environments 40A and 40B are described as user environments running in parallel on the network terminal 1 and 100 according to the first and second embodiments and modification, it should be apparent that the effects of the present invention can be obtained when three or more user environments are running in parallel. Further, in the first and second embodiments, the collaborative applications perform handling of the device driver when in an active state and end such handling when leaving the active state. However, the collaborative applications may be configured to handle the device driver at all times, but to transfer data DD only when active and not when inactive.

What is claimed is:

1. A network terminal including a memory and hardware, comprising: a plurality of communication units provided in one to one correspondence with a plurality of user environments that are configured to run in parallel on the network terminal connected to an interface device, each communication unit being configured to implement an Internet Protocol telephone call in the corresponding user environment; a plurality of collaborating units provided in one to one correspondence with the plurality of communication units, each collaborating unit being configured to perform a collaborative control on the corresponding communication unit and the interface device to thereby establish communications between the interface device and the corresponding communication unit; and a monitoring unit that monitors whether any of the collaborating units is performing the collaborative control, wherein one of the plurality of collaborating units performs the collaborative control when the subject collaborating unit of the plurality of collaborating units receives: notification from the monitoring unit indicating that none of the plurality of collaborating units is performing a collaborative control; and notification from the interface device specifying the subject collaborating unit as a specified collaborating unit to perform the collaborative control on the subject collaborating unit and the interface device.

2. The network terminal according to claim 1, further comprising a notifying unit that notifies the interface device that one of the plurality of collaborative units is unable to perform the collaborative control when the subject collaborating unit receives:
notification from the monitoring unit indicating that one of the plurality of collaborating units is performing the collaborative control; and notification from the interface device specifying the subject collaborating unit as the specified collaborating unit.

3. The network terminal according to claim 1, wherein each collaborating unit transmits to the interface device identification data for the corresponding user environment, the identification data identifying user of the corresponding communication unit.

4. The network terminal according to claim 1, further comprising a storage device, and
wherein the monitoring unit stores start notification in the storage device when each collaborating unit starts performing the collaborative control.

5. The network terminal according to claim 4, wherein the monitoring unit stores end notification in the storage device when each collaborating unit ends performing the collaborative control.

6. The network terminal according to claim 1, wherein one of the plurality of collaborating units specifies the subject collaborating unit as the specified collaborating unit when the subject collaborating unit receives: notification from the monitoring unit indicating that none of the plurality of collaborating units is performing the collaborative control; and a request for communicating with the subject communication unit via the network from another Internet Protocol telephone call terminal device.

7. The network terminal according to claim 6, wherein one of the plurality of collaborating units notifies another Internet Protocol telephone call terminal device that the subject collaborating unit is unable to perform the collaborative control, when the subject collaborating unit receives: notification from the monitoring unit indicating that one of the plurality of collaborating units is performing the collaborative control; and a request for communicating with the subject communication unit via the network from the another Internet Protocol telephone call terminal device.

8. A network terminal connected to an interface device, the network terminal comprising a controller, the controller executing:
a multi-user operating system installed on the network device, the multi-user operation system configured to run a plurality of different user environments in parallel;
a plurality of communication applications installed on the network device, the plurality of communication applications being provided in one to one correspondence with a plurality of user environments and being configured to run in parallel, each communication application being configured to implement an Internet Protocol telephone call in the corresponding user environment; and
a plurality of collaborating applications installed on the network terminal, the plurality of collaborating applications being provided in one to one correspondence with a plurality of communication applications and being configured to run in parallel, each collaborating application being configured to perform a collaborative control on the corresponding communication application and the interface device to thereby establish communications between the interface device and the corresponding communication application, at least one of the plurality of collaborating applications running, a monitoring application that monitors whether any of the collaborating applications is performing the collaborative control, wherein one of the at least one running collaborating application performs the collaborative control when a subject collaborating application of the plurality of collaborating applications receives:

notification from the monitoring application indicating that none of the at least one running collaborating application is performing the collaborative control; and notification from the interface device specifying the subject collaborating application as a specified collaborating application to perform the collaborating control on the subject collaborating application and the interface device.

9. The network terminal according to claim 8, wherein each collaborating application transmits to the interface device identification data for the corresponding user environment, the identification data identifying user of the corresponding communication application.

10. The network terminal according to claim 8, wherein each collaborating application transmits the identification data to the interface device when the each collaborating application is launched.

11. The network terminal according to claim 10, wherein each collaborating application transmits the identification data to the interface device again when the each collaborating application is ended.

12. The network terminal according to claim 10, wherein each collaborating application repeatedly transmits the identification data to the interface device by a prescribed interval while the collaborating application is running 13. A method executed by a network terminal configured to run a plurality of user environments in parallel and being connected to an interface device, the network terminal executing a plurality of communication applications installed on the network device, the plurality of communication applications being provided in one to one correspondence with a plurality of user environments and being configured to run in parallel, each communication application being configured to implement an Internet Protocol telephone call in the corresponding user environment, the method comprising:

monitoring whether any of a plurality of collaborating applications is performing the collaborative control, the plurality of collaborating applications being provided in one to one correspondence with the plurality of user environments that are configured to run in parallel on the network terminal, and being configured to run in parallel, each collaborating application being configured to perform a collaborative control on the corresponding communication application and the interface device to thereby establish communications between the interface device and the corresponding communication application; and performing the collaborative control by one of the at least one running collaborating application when a subject collaborating application of the plurality of collaborating applications receives:

notification from the monitoring application indicating that none of the at least one running collaborating application is performing the collaborative control; and notification from the interface device specifying the subject collaborating application as a specified collaborating application to perform the collaborating control on the subject collaborating application and the interface device.

14. A non-transitory computer-readable recording medium that stores a computer program for a network terminal configured to run a plurality of user environments in parallel and being connected to an interface device, the network terminal executing a plurality of communication applications installed on the network device, the plurality of communication application being provided in one to one correspondence with a plurality of user environments and being configured to run in parallel, each communication application being configured to implement an Internet Protocol telephone call in the corresponding user environment, the computer program instructions for:

monitoring whether any of a plurality of collaborating applications is performing the collaborative control, the plurality of collaborating applications being provided in one to one correspondence with the plurality of user environments, that are configured to run in parallel on the network terminal, and being configured to run in parallel, each collaborating application being configured to perform a collaborative control on the corresponding communication application and the interface device to thereby establish communications between the interface device and the corresponding communication application; and performing the collaborative control by one of the at least one running collaborating application when a subject collaborating application of the plurality of collaborating applications receives:

notification from the monitoring application indicating that none of the at least one running collaborating application is performing the collaborative control; and notification from the interface device specifying the subject collaborating application as a specified collaborating application to perform the collaborating control on the subject collaborating application and the interface device.

15. A system comprising:

an interface device;

a network terminal configured to run a plurality of user environments in parallel and being connected to the interface device, the network terminal comprising:

a plurality of communication units provided in one to one correspondence with a plurality of user environments, each communication unit being configured to implement an Internet Protocol telephone call in the corresponding user environment; and a plurality of collaborating units provided in one to one correspondence with the plurality of communication units, each collaborating unit being configured to perform a collaborative control on the corresponding communication unit and the interface device to thereby establish communications between the interface device and the communication unit; and a monitoring unit that monitors whether any of the collaborating units is performing the collaborative control, wherein the interface device specifies one of the running collaborating unit as specified collaborating unit, and wherein one of the plurality of collaborating units performs the collaborative control, when a subject collaborating unit of the plurality of collaborating units receives:
notification from the monitoring unit indicating that none of the plurality of collaborating units is performing a collaborative control; and
notification from the interface device specifying the subject collaborating unit as a specified collaborating unit to perform the collaborating control on the subject collaborating unit and the interface unit.

16. The system according to claim 15, wherein the interface device comprises a storage device,
wherein each collaborating application transmits to the interface device identification data for the corresponding user environment when the each collaborating application is launched, the identification data identifying user of the corresponding communication application, and the interface device stores the identification data in the storage unit when the interface device receives the identification data from the collaborating application; and
wherein each collaborating application transmits the identification data to the interface device again when the each collaborating application is ended, and the interface device deletes the identification data from the storage unit when the interface device receives the identification data from the collaborating application again.

17. The system according to claim 15, wherein the interface device comprises a storage device,
wherein each collaborating application repeatedly transmits to the interface device identification data for the corresponding user environment by a prescribed interval while the collaborating application is running, the identification data identifying user of the corresponding communication application, and the interface device stores the identification data in the storage unit, and
wherein the interface device deletes the identification data from the storage unit if the interface device receives no identification from the subject collaborating unit when the prescribed interval has elapsed after the interface device has received the identification data from the subject collaboration unit.

18. The system according to claim 15, wherein the monitoring unit is provided on the interface device.

\* \* \* \* \*